July 22, 1930.　　　　　L. L. WILLIAMS　　　　　1,771,386
MOLDING FOR AUTOMOBILE BODIES AND THE LIKE
Original Filed Nov. 18, 1927
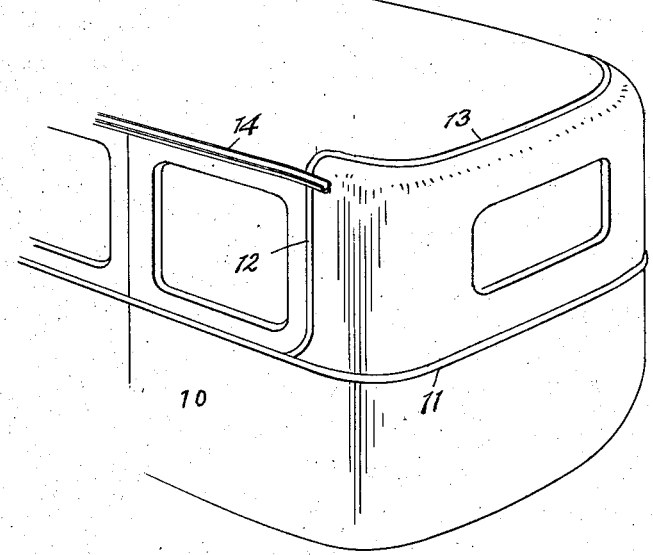
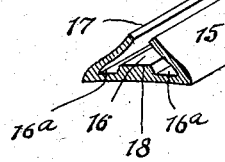 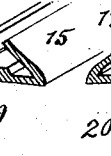 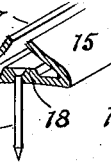  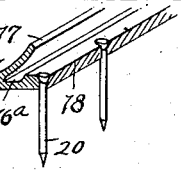
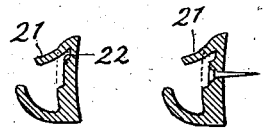 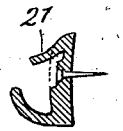 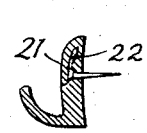
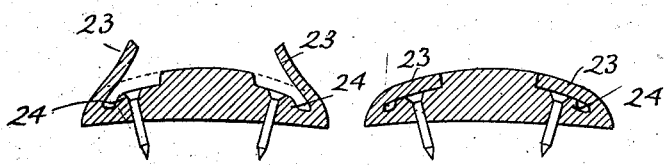
Inventor:
Leo L. Williams
Kwis Hudson Kent
attys Patented July 22, 1930

1,771,386

UNITED STATES PATENT OFFICE

LEO L. WILLIAMS, OF CLEVELAND HEIGHTS, OHIO

MOLDING FOR AUTOMOBILE BODIES AND THE LIKE

Application filed November 18, 1927, Serial No. 234,288, and in Canada February 2, 1927. Renewed February 3, 1930.

This invention relates to moldings, such for example as are employed on automobile bodies and elsewhere, for the purpose of ornamenting and covering joints in the construction of the body or device to which the molding is applied, and it covers certain improvements over the moldings disclosed in my pending application, Serial No. 85,473, filed February 2, 1926, patented May 21, 1929, No. 1,714,478.

An object of the invention is to provide a molding which will present a smoother and more finished appearance and which may be more readily applied than the molding of my application above referred to.

The invention consists in certain novel details of construction described in the following specification and set forth in the appended claims.

In the accompanying sheet of drawings, wherein I have illustrated certain embodiments of the invention, Fig. 1 is a perspective view of a portion of an automobile body equipped with several molding strips;

Figs. 2 to 5 are views partly in perspective and partly in section illustrating one form that the invention may assume, and showing different stages in its application;

Fig. 6 is a longitudinal sectional view of the molding strip of Figs. 2 to 5;

Figs. 7, 8 and 9 are sectional views of a so-called drip molding embodying the invention; and Figs. 10 and 11 are sectional views illustrating another modified form which the invention may assume.

The numeral 10 designates a vehicle body that is provided with a so-called belt molding 11, a vertical quarter molding 12, a roof molding 13 and a drip molding 14. These moldings are applied primarily for the purpose of closing the joints in the sheets of metal or other material with which the body is formed, and additionally the molding 14 finishes the top or roof and serves as a drip trough.

The moldings disclosed in my application above referred to consist preferably of a strip of extruded malleable metal in the form of an open channel, having a longitudinally extending groove therein, the base of the groove comprising portions of different thicknesses, that portion of relatively greater thickness and strength which is intermediate the lateral edges of the base having apertures adapted to receive retaining devices and the strip also having a longitudinally extending portion or portions (hereinafter referred to as lips, wings or flanges) adapted to be bent or driven inwardly after the molding is secured to a surface, so that the retaining devices are completely covered and the finished exterior is smooth and unbroken.

I have found it highly desirable to so form or proportion the molding on the inner side thereof that a relatively thickened portion is formed where the lip or lips and base contact in the closing operation to provide a stop which limits the inward swinging movement of the lip or lips so that in the closing operation the lip or lips may be driven and folded inwardly more readily producing a smoother outer surface and eliminating the possibility of a wavy appearance. The relatively thickened portion which, in all forms of the molding herein illustrated, is formed on the base of the molding, forms a base of unequal thickness inside of the lip, or from lip to lip where the molding has two inwardly foldable lips, the metal being relatively thin with the appearance of a relief groove just inside of the base of the lip or of each lip, but the important feature is the increased thickness where the lip and base meet when the molding is closed. The primary purpose and most important function thereof is not to facilitate the bending about the base of the lip as a hinge point, but to distribute and limit the bending between the free edge of the lip and a point or line a short distance from the base of the lip so that when the molding is closed it will have the desired or predetermined exterior shape and curvature in conformity with the exterior curvature which the open or originally extruded molding has at and adjacent the base of the lip, the curved shape at this point being unchanged in the closing operation as will be seen by reference to the drawings. To this end I have illustrated in Figs. 2 to 6 inclusive a molding 15 provided with a longitudinally extending groove 16 that extends the full length of the strip and is centrally disposed with respect thereto. The sides of the groove 16 are formed by longitudinally extending lips or flanges 17 which are adapted to be driven inwardly with their edges abutting so that the retaining devices are completely covered and the finished exterior is smooth and unbroken. The bottom of the groove just inside of and adjacent the bases of the lips 17 is cut away or deepened in accordance with the present invention, as indicated by the numeral 16ª, leaving an upstanding centrally disposed, strengthening and sustaining rib 18 which constitutes the relatively thickened portion referred to above and which is adapted to be provided with apertures 19, through which retaining devices 20 may be inserted or driven. This rib forms the equivalent of a buttress onto which the lips are folded or bent in the closing operation, as illustrated in Fig. 5 while at the same time it serves to prevent distortion of the base when the retaining devices are applied. The retaining devices may be driven into the base and flush with the surface of the latter without causing the material to flow out of shape or become distorted. This will also resist any tendency for the outer edges of the base to lift up off of the adjacent surface during the application of the attaching devices.

In Figs. 7, 8 and 9 I have illustrated the invention as embodied in a drip molding, wherein a single lip 21 is provided, the relatively thickened portion being indicated at 22.

In the modification illustrated in Figs. 10 and 11, the molding is provided with lips 23 adjacent its edges, and the relatively thickened portion is indicated by the numeral 24.

The molding in all its different forms herein illustrated is preferably formed by the extrusion process of malleable material, and after the molding is extruded the holes are formed through the base of the groove to accommodate the retaining devices 20, as explained in my prior application.

With all forms of my invention whether the longitudinally extending groove is closed by bending and forcing inwardly two longitudinally extending lips, as in Figs. 2 to 6, or whether the longitudinally extending groove of the molding is closed by one lip, as in Figs. 7 to 9, wherein the molding is provided with one groove and one lip to be driven inwardly, and as in Figs. 10 and 11 where it is provided with two longitudinally extending grooves, each adapted to be closed by a longitudinally extending lip, when the lip or lips is or are driven inwardly, the free edge of the lip abuts solidly against a shoulder so as to form a smooth and substantially continuous and unbroken surface on the exterior of the molding and so as to close the joint with the evidence of a seam substantially eliminated, as indicated in Fig. 5, these results being obtained by the swaging action of the solidly abutting parts or by the flowing or readadjustment of the surface irregularities on the abutting surfaces. In the form of the invention illustrated in Figs. 2 to 6 the shoulder referred to is the edge of the companion lip, and in the form of the invention illustrated in Figs. 7 to 11 the shoulder referred to is the stationary or fixed part of the molding.

In illustrating my invention I have shown molding similar to those illustrated in my prior application, except that I have provided the relief depressions adjacent and inside the lips, so that the molding may be closed, as in my prior application, but more satisfactorily because of the present improvements and so as to leave the molding with a smoother exterior and more finished appearance.

While I have illustrated several forms of my invention, I do not desire to be confined to the precise constructions disclosed, but aim in my claims to cover all modifications which do not involve a departure from the spirit and scope of the invention as defined in the appended claims.

Having thus described my invention, what I claim is:

1. A molding of malleable metal in the form of an open channel having a base through which attaching devices are adapted to be inserted from the channel opening intermediately of the edges of the molding and a wing integral with the base and foldable down onto the base over the attaching devices, one of said parts of the molding having a relatively thick portion projecting interiorly of the channel intermediately of the edges thereof and engaging with the other part in the closing operation to serve as a stop to limit the inward swinging movement of the wing in the closing operation and to insure a predetermined external contour to the closed molding.

2. A molding of malleable metal in the form of an open channel having a base through which attaching devices are adapted to be inserted from the channel opening intermediately of the edges of the molding and a wing integral with the base and foldable down onto the base over the retaining devices, one of said parts of the molding having a relatively thick portion projecting interiorly of the channel intermediately of the edges thereof and engageable with the other part in the closing operation to serve as a stop to limit the inward swinging movement of the wing in the closing operation and said first named part of the molding being thinner between the relatively thick portion and the juncture of the wing with the base.

3. A molding of malleable metal including a base and a wing integral with an extending outwardly at an angle with the base to form an open channel through which attaching devices are adapted to be inserted through the base intermediately of the edges thereof, the base having a relatively thick or elevated part onto which the wing is to be folded over the attaching devices in the closing operation to limit its folding movement and said base being thinner between said part and the juncture of the base with the wing.

4. A molding of malleable metal having a base portion and a top portion formed of two wings integral with the base and foldable inwardly thereover, the said portions forming an open channel through which attaching devices are adapted to be inserted through the base intermediately of the edges thereof, one of said portions being relatively thick where the wings and base portion meet to limit the inward folding movement of the wings when the molding is closed and being relatively thin between the thick part and the juncture of the wings with the base portion.

5. A one piece molding of malleable metal in the form of an open channel having a base portion through which attaching devices are adapted to be inserted from the channel opening intermediately of the edges of the molding, a wing foldable inwardly over the attaching devices, two longitudinally extending shoulder members at least one of which is at the free edge of the wing, the shoulder members being so formed that in the closing operation they solidly abut to form an unbroken outer surface, there being a longitudinally extending relatively thickened portion interiorly of the molding where the wing and base portion meet in the closing operation to limit the inward folding movement of the wing.

6. A molding comprising a strip of extruded malleable metal in the form of an open channel having a base portion through which attaching devices are adapted to be inserted from the channel opening intermediately of the edges of the molding, a continuous wing portion foldable inwardly over the attaching devices, one of said portions of the strip having a relatively thick part spaced from the edge of the base portion, which relatively thick part the other portion engages when the molding is closed so as to limit the inward folding movement of the wing and said strip also having a shoulder with which the free edge of the wing portion solidly abuts so as to form a substantially unbroken surface.

7. A one piece molding of malleable or pliable metal in the form of an open channel having a base portion through which attaching devices are adapted to be inserted from the channel opening intermediately of the edges of the molding, two outstanding longitudinally disposed continuous wings adapted to be folded inwardly over the attaching devices, the width of the wings being such that in the closing operation their edges solidly abut so as to form a substantially unbroken outer surface, the metal of the molding being relatively thick where the wings and the base meet when the molding is closed, to limit the inward folding movement of the wings and to insure a predetermined external contour of the closed molding.

8. A one piece molding of malleable or pliable metal in the form of an open channel having a base portion through which attaching devices are adapted to be inserted from the channel opening intermediately of the edges of the molding, said base portion being provided with a longitudinally extending pier intermediately of the edges of the molding, and an outstanding longitudinally extending continuous wing on each side of said pier adapted to be folded inwardly onto the pier over the attaching devices, the width of the wings being such that in the closing operation their edges solidly abut so as to form a substantially unbroken outer surface.

In testimony whereof, I hereunto affix my signature.

LEO L. WILLIAMS.